United States Patent [19]
Chang

[11] Patent Number: 6,014,244
[45] Date of Patent: Jan. 11, 2000

[54] MULTI-PORT OPTICAL CIRCULATOR UTILIZING IMAGING LENS AND CORRECTION OPTICAL ELEMENT

[75] Inventor: Kok-Wai Chang, Sunnyvale, Calif.

[73] Assignee: Hewlett-Packard Company, Palo Alto, Calif.

[21] Appl. No.: 09/100,666

[22] Filed: Jun. 18, 1998

[51] Int. Cl.[7] ..................................................... G02F 1/09
[52] U.S. Cl. ............................................. 359/281; 385/11
[58] Field of Search ............................... 385/33; 359/484, 359/487, 497, 499, 281; 372/703

[56] References Cited

U.S. PATENT DOCUMENTS

| | | | |
|---|---|---|---|
| 4,712,880 | 12/1987 | Shirasaki | 350/377 |
| 4,981,335 | 1/1991 | Gaebe | 350/96 |
| 5,204,771 | 4/1993 | Koga | 359/281 |
| 5,319,483 | 6/1994 | Krasinski et al. | 359/113 |
| 5,471,340 | 11/1995 | Cheng et al. | 359/281 |
| 5,566,259 | 10/1996 | Pan et al. | 385/11 |

FOREIGN PATENT DOCUMENTS

WO 97/22034  6/1997  WIPO ............................ G02B 27/28

*Primary Examiner*—Georgia Epps
*Assistant Examiner*—Timothy J Thompson

[57] ABSTRACT

A nonreciprocal optical device, preferably an optical circulator, and a method of transferring optical signals utilize a compensating lens coupled optically to a focusing lens. The compensating lens operates to correct misalignments caused by the focusing lens. The focusing lens and the compensating lens provide efficient coupling of optical fibers. Preferably, the compensating lens has a forward face with a number of flat surfaces that can refract light in a desired manner. In a first embodiment, two compensating lenses in optical series between two focusing lenses are utilized. In a second embodiment, only one compensating lens is utilized, but a mirror assembly is introduced so that polarization components of a light beam propagate through the compensating lens twice. In the first embodiment, the circulatory functions are accomplished by two optical assemblies and a shift plate. On the other hand, the circulatory functions in the second embodiment are performed by only one optical assembly and a shift plate. The single optical assembly is utilized twice in single transmission of a light signal, providing a compact optical device.

18 Claims, 13 Drawing Sheets

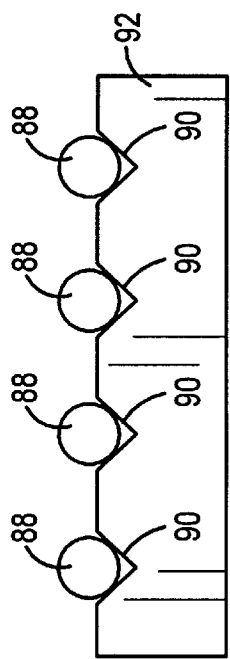
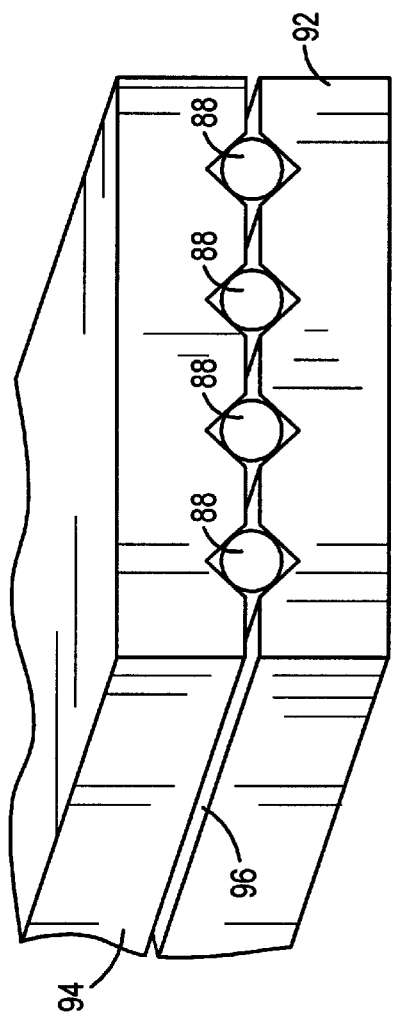

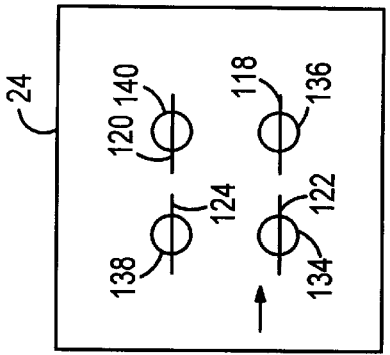
FIG. 13
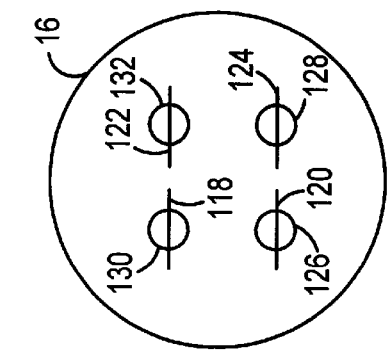
FIG. 12
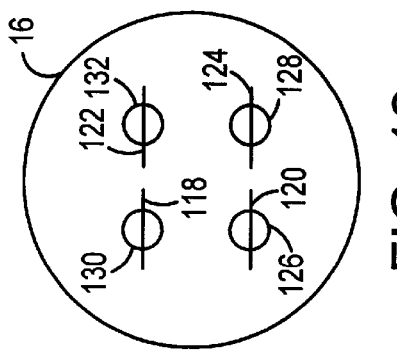
FIG. 11
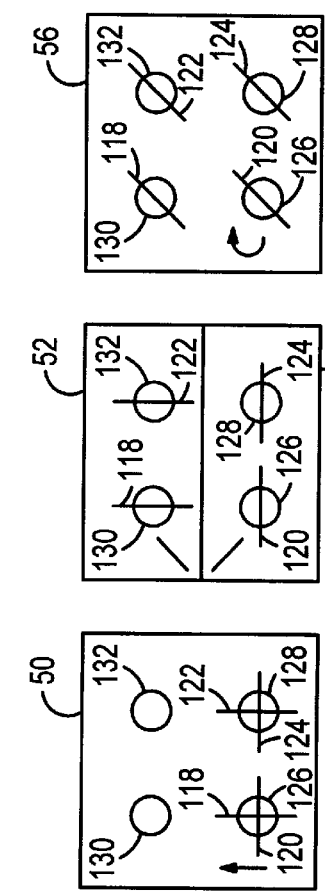
FIG. 10 / FIG. 9 / FIG. 14
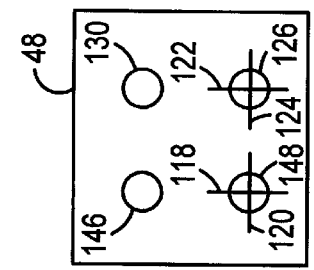
FIG. 18
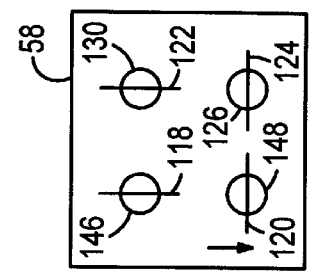
FIG. 17
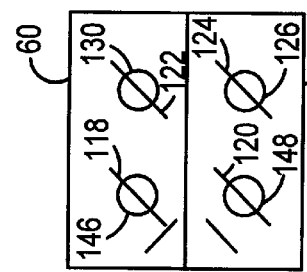
FIG. 16
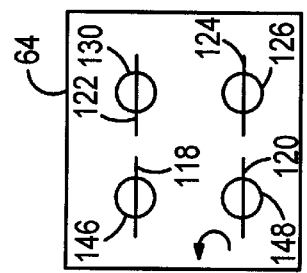
FIG. 15
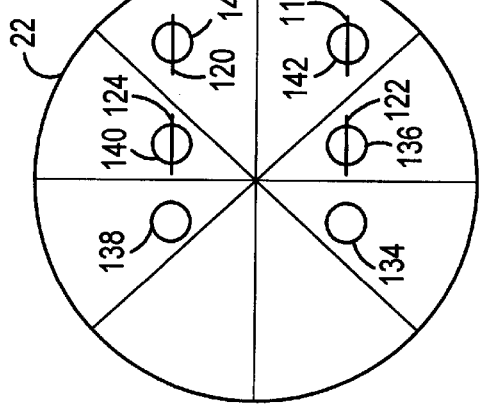

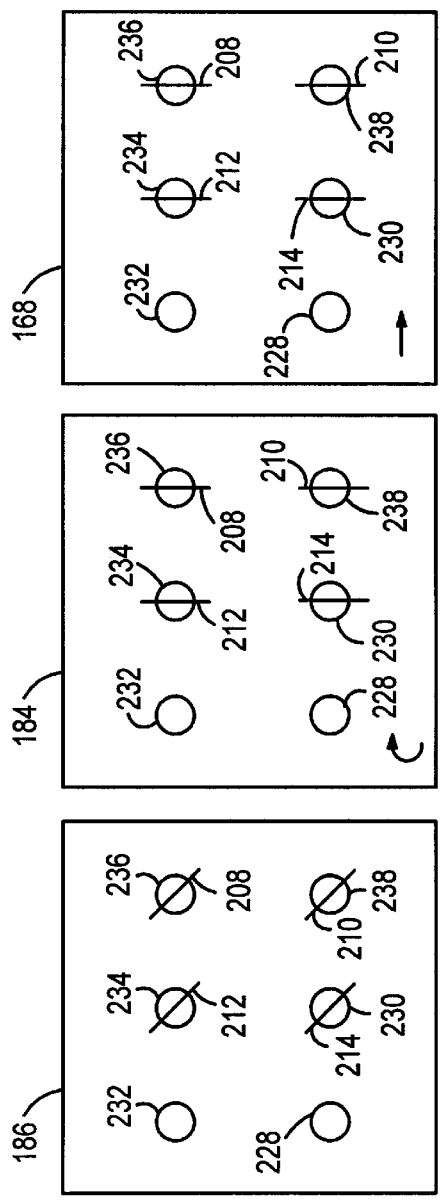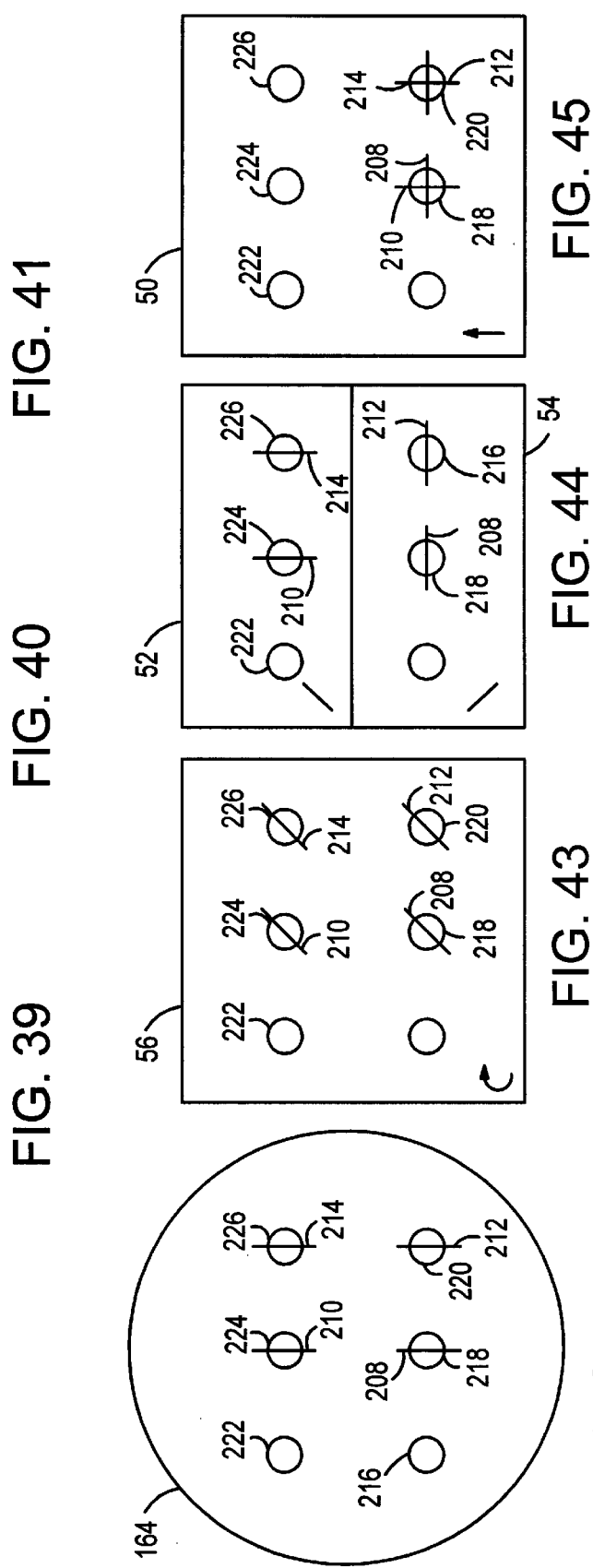

MULTI-PORT OPTICAL CIRCULATOR UTILIZING IMAGING LENS AND CORRECTION OPTICAL ELEMENT

TECHNICAL FIELD

The invention relates generally to nonreciprocal optical devices and more particularly to an optical circulator that can accommodate transmissions among multiple optical fibers.

DESCRIPTION OF THE RELATED ART

Continuing innovations in the field of fiber optic technology have contributed to the increasing number of applications of fiber optics in different technologies. The flexibility and reliability of communication networks based upon transmission of light signals via optical fibers are greatly increased by the availability of assemblies such as optical circulators and isolators. Optical circulators enable a bidirectional fiber to be coupled to both an input optical fiber and an output optical fiber. Optical isolators provide forward propagation of light signals from an input optical fiber to an output optical fiber, while inhibiting light from propagating in the rearward direction from the output optical fiber to the input optical fiber.

U.S. Pat. No. 5,204,771 to Koga describes an optical circulator having three birefringent crystals and two nonreciprocal rotator assemblies. Each of the two nonreciprocal rotator assemblies is positioned between two adjacent birefringent crystals. The nonreciprocal rotator assemblies are comprised of a Faraday rotator, a left half-wave plate, and a right half-wave plate. The left half-wave plate provides a rotation of polarization components of light beams in a direction that is opposite to the direction of rotation caused by the right half-wave plate. The optical circulator of Koga includes an input/output port on one face of the optical circulator assembly. On the opposite face, an output port and an input port are positioned such that the input port is located above the output port. The optical circulator of Koga operates to transmit light signals received by the input port to the input/output port. However, light signals that are received by the input/output port are directed to the output port, instead of being directed back to the input port.

Another optical circulator of interest is described in U.S. Pat. No. 5,471,340 to Cheng et al. In an attempt to reduce the number of required components for achieving optical isolation or circulation, the optical circulator of Cheng et al. utilizes a mirror at one end of an optical assembly. Adjacent input/output ports are situated at the end of the assembly opposite to the mirror. The optical assembly includes a first birefringent crystal, upper and lower half-wave plates, a first Faraday rotator, a second birefringent crystal, and a second Faraday rotator. In operation, a light beam enters the optical assembly from one of the input/output ports. The first birefringent crystal divides the light beam into two polarization components. The adjacent nonreciprocal Faraday rotator and the upper and lower half-wave plates properly align the polarization components for lateral displacement (walk-off) of one or both of the polarization components by the center birefringent crystal. The polarization components are rotated by the second Faraday rotator twice as the light beams are reflected by the mirror. The first birefringent crystal plate then recombines the two polarization components for output to a different input/output port.

There are a number of factors that must be considered in the design of optical circulators and isolators. U.S. Pat. No. 5,319,483 to Krasinski et al. identifies insertion loss and crosstalk as two performance-related design considerations. Insertion loss is the difference in power between input light and the light that exits the optical assembly. The primary causes of insertion loss are identified as absorption of light and imperfections of polarization separation and recombination. Crosstalk in an optical circulator is the transmission of light from an input fiber to a fiber which is not the intended output fiber. Krasinski et al. assert that the primary cause of crosstalk in optical circulators is back-reflection from the various optical elements in the assembly. The system described in the patent utilizes birefringent crystals instead of polarization splitting cubes in an attempt to provide more complete polarization separation, thereby reducing insertion loss and crosstalk. Moreover, the system is one in which the optical elements of the assembly are in optical contact with each other, thereby reducing back-reflections.

Another cause for insertion loss is dispersion of light beams when propagating through optical elements, which hinders efficient fiber-to-fiber coupling. One means to alleviate this concern is to use lenses to focus the light beams. Patent Cooperation Treaty application No. PCT/AU96/00800by Frisken, published on Jun. 19, 1997, International Publication No. WO 97/22034, describes an optical circulator having a pair of lenses between two optical assemblies. The pair of lenses operates to focus light beams propagating through the optical circulator. Each of the two optical assemblies includes a Faraday rotator and a half-wave plate positioned between two birefringent crystals. The two optical assemblies perform separation, rotation, and recombination operations on polarization components of propagating light beams to facilitate circulation of light beams to and from optical fibers.

In addition to the above-identified performance-related concerns, there are manufacturing-related concerns. Preferably, the assembly is physically small, providing advantages with respect to the cost of materials and the ability to house a number of such assemblies. If there is an array of input/output ports at one side of an optical circulator or isolator, the core-to-core spacing between the ports (i.e., "pitch") may determine the width and the length of the assembly of optical elements. Conventionally, there is a pitch of at least 2 mm in order to accommodate the use of collimators. The minimum width of the assembly is the product of the pitch and the number of ports in the array. Rutile is a common material for forming the birefringent crystals that provide the desired walk-off displacements within the assembly. For each 1 mm of walk-off, the rutile crystal must have a thickness of approximately 10 mm. The thicknesses of the other optical elements in the assembly, e.g. the Faraday rotator, add to the total thickness dimension of the assembly.

While known optical circulators operate well for their intended purposes, improvements in performance and reduction in fabrication cost are desired in a design of optical circulators. What is needed is an optical circulator for coupling multiple optical fibers for transmitting signals, such as light signals within a communication network, with a high density of input/output ports and with a significant cost efficiency in the fabrication process.

SUMMARY OF THE INVENTION

A nonreciprocal optical device, preferably an optical circulator, and a method of transferring optical signals utilize a compensating lens coupled optically to a focusing lens. The compensating lens operates to correct misalignment caused by the focusing lens. Preferably, the compensating lens has a forward face with number of flat surfaces that can refract diverging light received from the rearward face of the compensating lens into parallel light. In addition, the compensating lens is able to receive parallel light on the forward face and refract the parallel light such that the light is emitted from the rearward face in a converging manner.

In a first embodiment of the invention, the nonreciprocal optical device includes two compensating lenses in optical series between two focusing lenses. The two focusing lenses are preferably identically shaped converging lenses. Although not critical to the invention, the focusing lenses may be configured to provide 1:4 imaging. Similar to the focusing lenses, the two compensating lenses are physically identical. The two compensating lenses are positioned such that the forward faces of the compensating lenses are face-to-face. Preferably, the four lenses are positioned such that the distance between the first focusing lens and the first compensating lens is equal to the distance between the second compensating lens and the second focusing lens. The focusing lenses and the compensating lenses provide efficient coupling of optical fibers. The circulatory functions are accomplished by two optical assemblies and a shift plate.

The first optical assembly includes a walk-off crystal, upper and lower half-wave plates, and a Faraday rotator. The first optical assembly operates to separate a light beam into two orthogonal polarization components and rotates one of the two polarization components such that both polarization components are aligned to be shifted laterally, i.e., positive or negative x-direction, by the shift plate. The second optical assembly operates to recombine the two polarization components for output via a predetermined optical fiber. Preferably, the first and second optical assemblies are structurally identical. The only difference between the two optical assemblies is the orientation of the second optical assembly with respect to the first optical assembly. The second optical assembly is rotated 180°, such that forward and rearward faces of the second optical assembly are switched with respect to the faces of the first optical assembly.

The optical elements in the first optical assembly, and consequently the second optical assembly, can be configured in a number of alternative arrangements without affecting the operations of the first optical assembly and the second assembly. First, the walk-off crystal may have a walk-off direction in either vertical direction, i.e., positive or negative y-direction, to separate the polarization components of a light beam. Second, the upper and lower half-wave plates can be positioned either in front of the Faraday rotator or rearwardly of the Faraday rotator. The only criterion is that the half-wave plates are arranged such that one polarization component of a light beam travels through the upper half-wave plate, while the other polarization component travels through the lower wave plate. Preferably, each of the Faraday rotator and the half-wave plates provides a 45° rotation of polarization components. If the walk-off crystal has a walk-off direction in the positive y-direction, the Faraday rotator and the upper half-wave plate can provide clockwise rotations of a forward propagating polarization component, while the lower half-wave plate provides a counter-clockwise rotation. Alternatively, the Faraday rotator and the upper half-wave plate can provide counter-clockwise rotations, while the lower half-wave plate provides a clockwise rotation. If the walk-off crystal has a walk-off direction in the negative y-direction, the rotations of the upper and lower half-wave plates are reversed.

In the preferred embodiment, the shift plate is positioned between the two compensating lenses. The shift plate only displaces forward propagating polarization components in a lateral direction. This is due to the orientation of the polarization components caused by the first optical assembly. In the forward direction, all of the polarization components are aligned horizontally when propagating through the shift plate. However, in the rearward direction, the polarization components are aligned vertically.

The nonreciprocal optical device of the first embodiment operates to couple first and second optical fibers to a single third optical fiber. For example, the first and second optical fibers can be positioned adjacent to the second optical assembly, while the third optical assembly is positioned adjacent to the first optical assembly. A light beam from the third optical fiber will be transmitted to the second optical fiber, while a light beam from the first optical fiber will be transmitted to the third optical fiber. However, a light beam from the second optical fiber will not be transmitted to the third optical fiber.

In operation, a forward propagating light beam enters the first optical assembly from a first optical fiber. The light beam is separated into first and second polarization components by the walk-off crystal in the first optical assembly. The first polarization component has a vertical polarization state, while the second polarization component has a horizontal polarization state. The first polarization component is then rotated 90° by the first optical assembly. The first and second polarization components then exit the first optical assembly and encounter the first focusing lens. The focusing lens initially converges the polarization components to a focal point of the first focusing lens. However, after the focal point, the polarization components begin to diverge. In addition, the relative positions of the polarization components are inverted by the converging and diverging process. Next, the polarization components impinge upon the first compensating lens. Each polarization component is refracted at a flat surface of the compensating lens, such that the polarization components cease to diverge and propagate in parallel with respect to the other polarization component.

Next, the polarization components propagate through the shift plate, which displaces the polarization components in either the positive or the negative x-direction. The polarization components are then caused to converge by the second compensating lens. Again, each polarization component is refracted at a flat surface of the second compensating lens. The polarization components converge to a focal point of the compensating lens and begin to diverge. The polarization components then travel through the second focusing lens, which alters the propagation direction of the polarization component such that the polarization components are again propagating in parallel. The second optical assembly then rotates the first polarization again by 90° and recombines the first and second polarization components. The combined polarization components of the light beam are transmitted to a second optical fiber.

A rearward propagating light beam from the second optical fiber is not transmitted to the first optical fiber. In the rearward direction, the rotation caused by the second assembly is such that the rearward propagating polarization components of the light beam are not displaced by the shift plate. Therefore, the polarization components follow a different propagation path. The two compensating lenses and the two focusing lenses operate on rearward propagating polarization components in the exact opposite manner as on forward propagating polarization component. The second focusing lens now converges the polarization components, while the first focusing lens alters the polarization components to propagate in parallel. In addition, the converging function is performed by the first compensating lens, instead of the second compensating lens.

In a second embodiment of the invention, the second optical assembly, the second focusing lens, and the second compensating lens are removed. Instead, a mirror assembly is placed rearwardly of the shift plate. In this embodiment, a forward propagating light beam emitted from a first optical fiber in an array of fibers is transmitted to an adjacent second optical fiber in the array of fibers in a rearward direction. A light beam emitted from the second optical fiber is transmitted to a third optical fiber, etc.

The mirror assembly includes a mirror and a Faraday rotator. The Faraday rotator operates to change the polarization states of polarization components, so that reflected polarization components are not shifted a second time by the shift plate. The Faraday rotator rotates polarization components by 45° before reflection and again after reflection. The overall effect of the Faraday rotator is a 90° rotation of the polarization components.

In operation, the first optical assembly separates polarization components of a light beam from a first optical fiber and rotates one of the polarization components by 90°. The polarization components then travel through the first focusing lens, which causes the polarization components to diverge. The compensating lens then adjusts the propagating directions of the polarization components, such that they are propagating in parallel. Next, the polarization components are displaced by the shift plate and travel through the mirror assembly. The Faraday rotator in the mirror assembly rotates the polarization components by 45°. The polarization components are then reflected by the mirror. The polarization components again travel through the Faraday rotator, which rotates the polarization components by another 45°.

Next, the polarization components propagate through the shift plate. However, because the polarization components have been rotated perpendicularly, the polarization components are not displaced by the shift plate. The polarization components then travel through the first compensating lens and first focusing lens. Operating in an opposite manner, the compensating lens converges the polarization components, and the focusing lens then adjust the polarization components such that they are propagating in parallel. In the rearward direction, the first optical assembly rotates one of the polarization components and recombines the polarization components. The recombined polarization components are then transmitted to an adjacent optical fiber in the array of fibers with respect to the first optical fiber.

A method of transferring circulating optical signals from multiple optical fibers utilizes the nonreciprocal optical device in accordance with the invention. First, a light beam is received by an optical assembly of the multi-port optical circulator from a first optical fiber in an array of fibers. The light beam is then separated into polarization components by the optical assembly. Next, one of the polarization components is rotated, such that both polarization components have a common polarization state. The polarization components are then diverged, such that the polarization components are moving away relative to each other. In the process of diverging the polarization components, the polarization components are also inversely projected.

Next, the polarization components are redirected, such that the polarization components are propagating in a parallel manner. After being redirected, the polarization components are laterally displaced. In one embodiment, the polarization components are reflected toward the array of fibers. In addition, the polarization components are rotated perpendicularly. The displaced polarization components are then converged, such that the separation distance of the polarization components is decreasing. Next, the converging polarization components are again redirected to propagate in a parallel manner. Propagating in the parallel manner, one of the polarization components is rotated perpendicularly. Lastly, the polarization components are recombined and transmitted to a second optical fiber.

An advantage of the invention is that fiber-to-fiber coupling efficiency is improved with the use of compensating lens(es). As a result, more fibers may be coupled using the invention. In addition, the optical assemblies utilized in both embodiments of the invention are compact. Still another advantage of the invention is that in the first embodiment of the invention the first and second optical assemblies are physically identical, lowering the cost of fabrication. Finally, the use of the mirror assembly in the second embodiment of the invention greatly reduces the overall size of the device, while maintaining the improved fiber-to-fiber coupling.

BRIEF DESCRIPTION OF THE DRAWINGS

FIG. 5 is an end view of a silicon substrate having V-shaped grooves for precisely aligning four optical fibers.

FIG. 6 is a partial perspective view of the silicon wafer of FIG. 3 having a second silicon substrate to sandwich the optical fibers into position.

FIGS. 9–18 illustrate the operations performed upon polarization components of forward propagating light beams through the multi-port optical circulator of FIG. 1.

FIGS. 39–45 illustrate the operations performed upon polarization components of rearward propagating light beams through the multi-port optical circulator of FIG. 29, after being reflected by the mirror at the rearward face of the multi-port optical circulator of FIG. 29.

DETAILED DESCRIPTION

Figure 1:
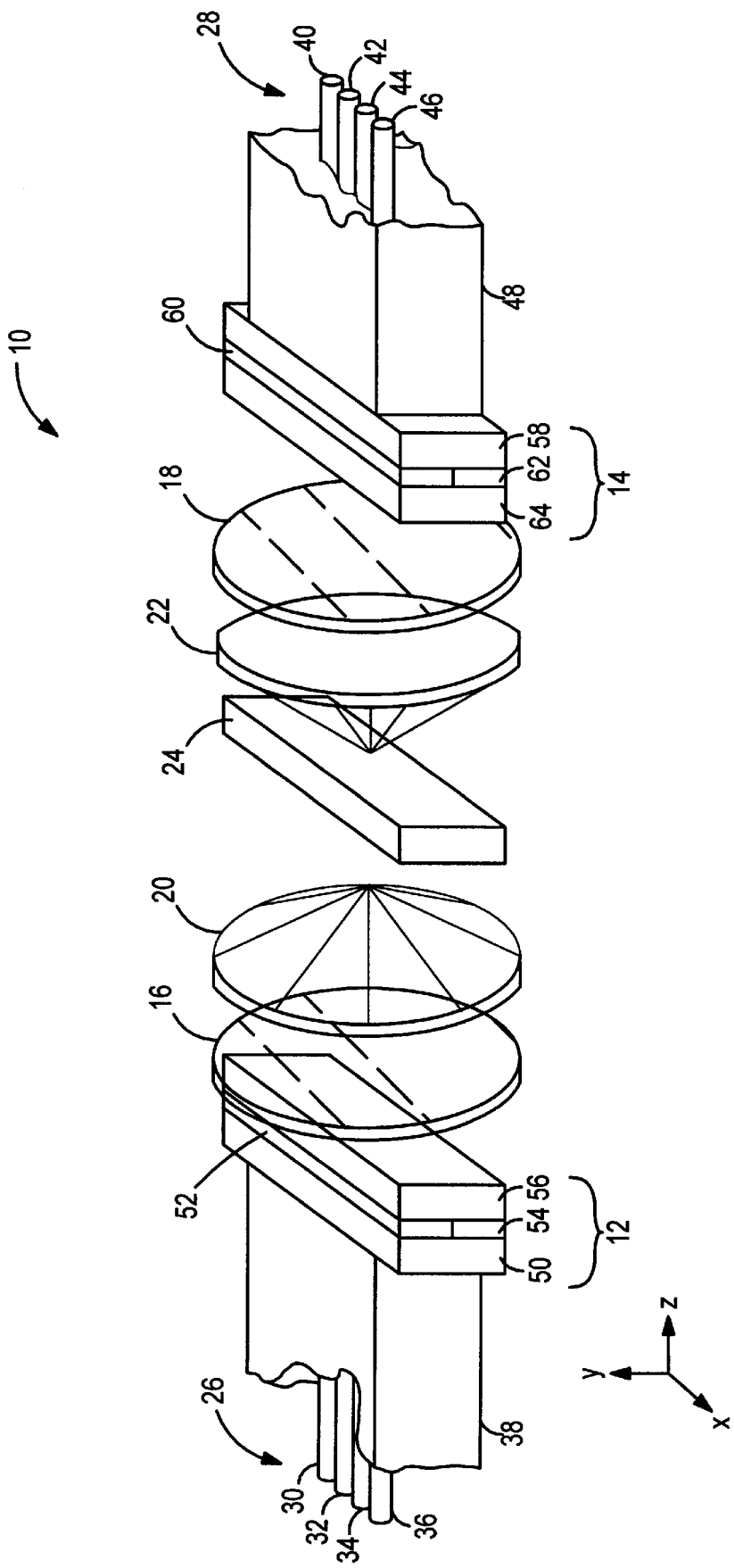
FIG. 1 is a perspective view of a multi-port optical circulator in accordance with a first embodiment of the invention.

In FIG. 1, a multi-port optical circulator 10 in accordance with a first embodiment of the invention is shown. The multi-port optical circulator 10 includes a first optical assembly 12, a second optical assembly 14, a pair of focusing lenses 16 and 18, a pair of compensating lenses 20 and 22, and a shift plate 24. The multi-port optical circulator 10 is positioned between two arrays of optical fibers 26 and 28. The array of fibers 26 includes optical fibers 30, 32, 34 and 36. The optical fibers 30–36 are positioned in place by a fiber holder 38. Similarly, the array of fibers 28 includes optical fibers 40, 42, 44 and 46 in a fiber holder 48.

Preferably, the optical fibers 30–36 and 40–46 are thermally expanded core (TEC) fibers having mode field diameters (MFDs) of approximately 20 μm. Although the fiber arrays 26 and 28 are shown as having four optical fibers, the fiber arrays 26 and 28 may include more or fewer optical fibers. While not critical to the invention, the TEC fiber arrays 26 and 28 have a pitch of 250 μm.

The optical assembly 12 includes a walk-off crystal 50, an upper half-wave plate 52, a lower half-wave plate 54, and a Faraday rotator 56. The walk-off crystal 50 provides a displacement in the positive y-direction of vertical polarization components of light beams that are propagating in the forward direction, i.e., positive z-direction. The walk-off crystal 50 may be made of rutile (titanium dioxide-$TiO_2$) or yttrium vanadate ($YVO_4$). In addition, inexpensive Lithium Niobate ($LiNbO_4$) may be used to form the walk-off crystal 50. The thickness of the walk-off crystal 50 depends on the type of the optical fibers 30–36 and 40–46, due to the difference in MFDs. Wider MFDs require greater spatial displacement by the walk-off crystal 50.

The upper half-wave plate 52 and the lower half-wave 54 are positioned such that the displaced polarization components propagate through the upper half-wave plate 52, while the horizontal polarization components propagate through the lower-half wave plate 54. The upper half-wave plate 52 and the Faraday rotator 56 operate to provide 90° rotation of polarization components propagating in the forward direction. However, due to the nonreciprocal nature of the Faraday rotator 56, the upper half-wave plate 52 and the Faraday rotator 56 provide 0° rotation for polarization components propagating in a rearward direction, i.e., negative z-direction. Conversely, the lower half-wave plate 54 and the Faraday rotator 56 operate to provide 0° rotation for polarization components of forwardly propagating light beams and 90° rotation for rearwardly propagating light beams.

The focusing lenses 16 and 18 are configured to focus polarization components traveling in either the forward or rearward direction. Preferably, the two focusing lenses 16 and 18 are physically identical converging lenses. While not critical to the invention, the focusing lenses 16 and 18 may provide 1:4 imaging. Preferably, the four lenses 16, 18, 20 and 22 are positioned such that the distance between the focusing lens 16 and the compensating lens 20 is equal to the distance between the compensating lens 22 and the focusing lens 18. In operation, the focusing lens 16 inversely projects polarization components propagating in the forward direction onto the compensating lens 20. The polarization components are projected at angles that depend upon the impinging position of a polarization component on the focusing lens 16. Similarly, the focusing lens 18 inversely projects polarization components propagating in the rearward direction onto the compensating lens 22. The compensating lenses 20 and 22 receive polarization components from either the focusing lens 16 or focusing lens 18 and refract the polarization components such that the angles caused by the focusing lenses 16 and 18 are countered. The result is that polarization components are propagating in a parallel manner between the compensating lenses 20 and 22, regardless of the propagating direction. Preferably, the compensating lens 20 is positioned at a distance from the focusing lens 16 that is greater than the focal length of focusing lens 16. In addition, the compensating lens 22 is positioned at a distance from the focusing lens 18 that is greater than the focal length of focusing lens 18.

The shift plate 24 is positioned between the compensating lenses 20 and 22. Preferably, the shift plate 24 is a walk-off crystal having a walk-off direction parallel to the x-axis. By properly orientating polarization components of light beams in both the forward and rearward directions, the shift plate 24 provides displacement of polarization components propagating in only one direction.

The second optical assembly 14 also includes a walk-off crystal 58, an upper half-wave plate 60, a lower half-wave plate 62, and a Faraday rotator 64. Preferably, the second optical assembly 14 is structurally identical to the first optical assembly 12, except for the orientation of the second optical assembly 14 with respect to the first optical assembly 12. The second optical assembly 14 is a mirror image of the first optical assembly 12. In other words, the second optical assembly 14 is the first optical assembly 12 that has been rotated 180° about the y-axis. For forward propagating light beams, the Faraday rotator 64 and the upper half-wave plate 60 rotate polarization components by 90°, while the Faraday rotator 64 and the lower half-wave plate 62 provide 0° rotation. Conversely, the Faraday rotator 64 and the upper half-wave plate 60 provide 0° rotation, while the Faraday rotator 64 and the lower half-wave crystal 62 provide 90° rotation for rearward propagating light beams. The walk-off crystal 58 provides displacement in the negative y-direction for vertical polarization components propagating in the forward direction.

Figure 3:
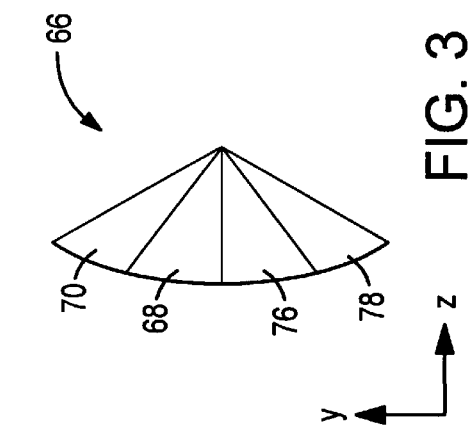
FIG. 3 is a side view of the compensating lens.
Figure 4:
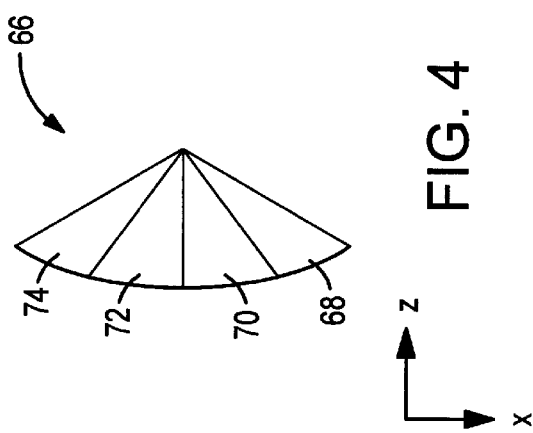
FIG. 4 is a top view of the compensating lens.
Figure 2:
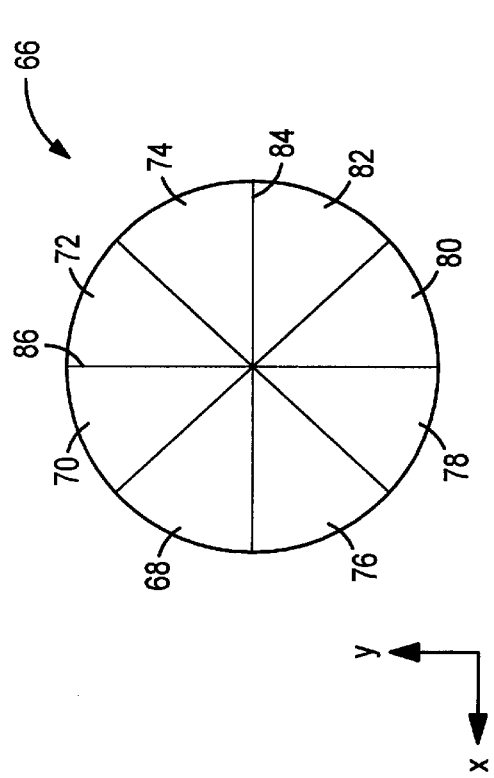
FIG. 2 is a front view of a compensating lens in the multi-port optical circulator of FIG. 1.

Turning to FIGS. 2, 3 and 4, a compensating lens 66 having eight surfaces 68, 70, 72, 74, 76, 78, 80 and 82 on a forward face is shown from various points of view. The upper surfaces 68–74 operate on displaced polarization components of light beams caused by either walk-off crystal 50 or 58. The lower surfaces 76–82 operate on the other non-displaced polarization components. An upper surface and a lower surface form a pair of surfaces that operates on polarization components of a single light beam. For example, if one polarization component of a light beam travels through the upper surface 70, the other polarization component will travel through the lower surface 78. Similarly, surfaces 68 and 76, 72 and 80, and 74 and 82 form the remaining pairs. The surfaces 68–82 are symmetrical about the horizontal centerline 84 and the vertical centerline 86.

The compensating lens 66 can be positioned such that the eight surfaces 68–82 are facing either the positive or negative z-direction. The compensating lens 20 of FIG. 1 is a compensating lens that is facing the positive z-direction. The compensating lens 22 of FIG. 1 is a compensating lens that is facing the negative z-direction. In operation, the compensating lens 66 can refract diverging polarization components of light beams to propagate in a parallel manner. Conversely, the compensating lens 66 can receive polarization components that are propagating in parallel and redirect the polarization components to propagate in a converging manner.

The fiber holders 38 and 48 of FIG. 1 can be composed of semiconductor substrates. Preferably, the fiber holders 38 and 48 are etched to form V-shaped grooves to properly position the input and output optical fibers 30–36 and 40–46. FIG. 5 illustrates optical fibers 88 positioned on V-shaped grooves 90 that are etched on a substrate, such as a silicon wafer 92. Conventional integrated circuit fabrication techniques may be utilized to form the grooves 90. For example, the grooves may be formed photolithographically, using a mask to define the grooves and using chemical etchant. While not critical, the angle of one of the V-shaped grooves 90 relative to the other wall is preferably 70.5°. The fiber holders 38 and 48 may also include another etched silicon wafer 94 that is affixed to the lower silicon wafer 92 by a layer of adhesive 96, as shown in FIG. 6. The use of an adhesive layer is not critical to the invention. Alternatively, wafer bonding may be used to attach the two silicon wafers 92 and 94.

Figure 7:
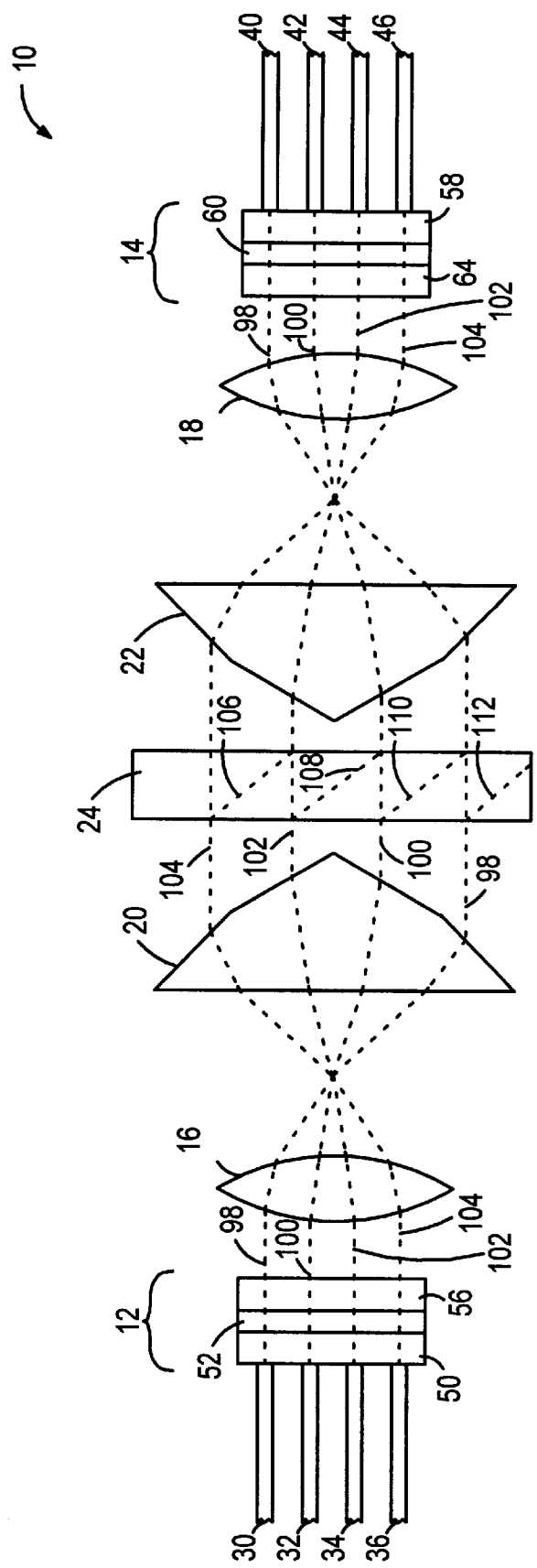
FIG. 7 is a top view of the multi-port optical circulator of FIG. 1 with illustrations of propagation paths in the x-direction.

In FIG. 7, a top view of the multi-port optical circulator 10 is illustrated. Also shown in FIG. 7 are four propagation paths 98, 100, 102 and 104. The four propagation paths 98–104 may represent paths taken by the displaced polarization components caused by either of the walk-off crystals 50 or 58. However, the four propagation paths 98–104 may also represent paths taken by the other non-displaced polarization components. The reason for the dual representation is that on an x-z plane the two polarization components follow the same path. The only difference between the paths taken by the two polarization components of a light beam is in the y-direction. The difference in paths with respect to the y-axis is illustrated below with reference to FIG. 8.

In a rearward direction, a light beam from any one of the optical fibers 40–46 follows the same referenced propagation paths 98–104. For example, a light beam from the optical fiber 40 would propagate through the optical assembly 14 in a negative z-direction following the propagation path 98. The propagation path 98 is initially located above the other propagation paths 100–104. The focusing lens 18 refracts the light beam, such that the propagation path 98 is now below the other propagation paths. The compensating lens 22 redirects the light beam, such that once again the propagation path 98 is in the negative z-direction.

Propagating through the shift plate 24, the light beam is not affected by the walk-off properties of the shift plate 24. This is due to rotation of the rearward propagating light beam by the optical assembly 14, such that the polarization components are aligned orthogonally to the walk-off direction of the shift plate 24. Therefore, displacing paths 106, 108, 110 and 112, illustrated within the shift plate 24, are not applicable for rearward propagating light beams. The light beam is then refracted in a converging manner by the compensating lens 20 and redirected by the focusing lens 16. Following the compensating lens 20 and focusing lens 16, the propagation path 98 of the light beam is back to a location above the other propagation paths 100–104. The propagation path 98 leads to the optical fiber 30. Therefore, light beams from the optical fiber 40 are coupled to the optical fiber 30. Similarly, light beams from optical fibers 42, 44 and 46 are coupled to optical fibers 32, 34 and 36, respectively.

In a forward direction, polarization components of a light beam are affected by the walk-off properties of the shift plate 24. Therefore, the propagation path of the light beam is shifted by the shift plate 24. For example, a light beam from the optical fiber 36 follows the propagation path 104. However, the light beam is displaced by the shift plate 24, because the operation of the optical assembly 12 aligns the polarization components of the light beam with the walk-off direction of the shift plate 24. The light beam travels through the displacing path 106, and then follows the propagation path 102. Thus, the light beam from the optical fiber 36 is coupled to the optical fiber 44. Similarly, light beams from the optical fibers 34 and 32 are coupled to the optical fibers 42 and 40, respectively. However, a light beam from the optical fiber 30 is not transmitted to any of the optical fibers 40–46. The light beam from the optical fiber 30 is displaced by the shift plate 24 to follow the displacing path 112 that is not aligned with any of the optical fibers 40–46.

Figure 8:
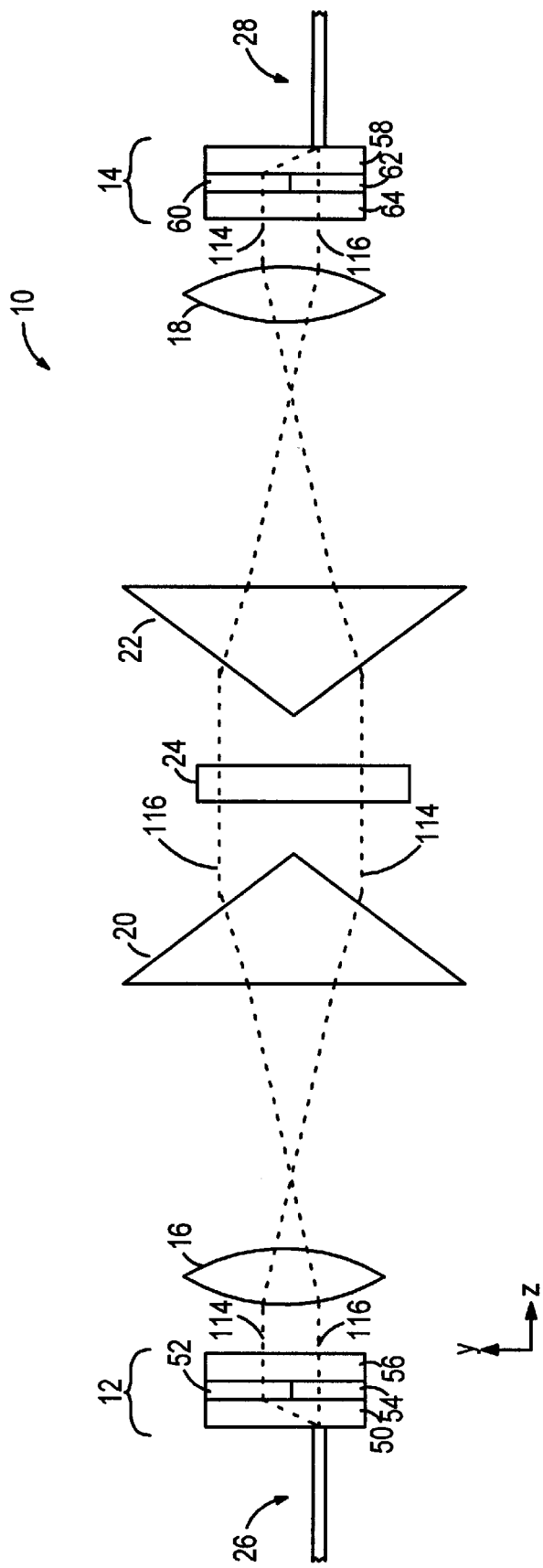
FIG. 8 is a side view of the multi-port optical circulator of FIG. 1 with illustrations of two propagation paths in the y-direction.

FIG. 8 illustrates a side view of the multi-port optical circulator 10. Also shown in FIG. 8 are two propagation paths 114 and 116 with respect to the y-axis. The two propagation paths 114 and 116 represent paths taken by polarization components of any light beam from one of the optical fibers 30–36 and 40–46 through the multi-port optical circulator 10.

In the forward direction, a light beam enters the optical assembly 12 from an optical fiber of the fiber array 26. The vertical polarization component of the light beam is displaced in the positive y-direction by the walk-off crystal 50. Therefore, the vertical polarization component will follow the propagation path 114, while the horizontal polarization component will follow the propagation path 116. The two polarization components are recombined by the walk-off crystal 58 and transmitted to an optical fiber of the array of optical fibers 28. However, as stated above, a light beam from the optical fiber 30 will not be transmitted to any optical fiber of the array of optical fibers 28. Rearward propagating polarization components of a light beam will also follow the same paths 114 and 116 in the same manner.

FIGS. 9–18 illustrate the operation of the multi-port optical circulator 10 on polarization components of light beams from the optical fibers 30–36. For simplicity, only two light beams from the optical fibers 32 and 34 that are propagating in the forward direction, i.e., positive z-direction, are illustrated. Each of the ten figures is an illustration of the relative positions of the polarization components of the two light beams before and after traveling through one of the optical elements in the multi-port optical circulator 10, as viewed from the position of the fiber array 26.

In FIG. 9, a first pair of orthogonal polarization components 118 and 120 and a second pair of orthogonal polarization components 122 and 124 that are about to enter input ports, i.e., windows, at the forward face of the optical assembly 12, are shown. The polarization components 118 and 120 represent a light beam from the optical fiber 32 that is about to enter the input port positioned at location 126. The polarization components 122 and 124 represent a light beam from the optical fiber 34 that is about to enter the other input port positioned at location 128. The other two locations 130 and 132 are positions of ports on the rearward face of the optical assembly 12. Preferably, the locations 130 and 132 are also positions of ports on the forward face of the optical assembly 14. In addition, the locations 126 and 128 preferably represent positions of ports on the rearward face of the optical assembly 14 that are aligned with the optical fibers 42 and 44, respectively. As will be described in detail below, the first light beam from the optical fiber 32 will be transmitted to the optical fiber 40, while the second light beam from the optical fiber 34 will be transmitted to the optical fiber 42.

The light beams enter the first optical assembly 12, encountering the walk-off crystal 50. As the light beams travel through the walk-off crystal 50, the aligned polarization components 118 and 122 are displaced in the positive y-direction, as indicated by the arrow in the lower left corner of FIG. 9. As shown in FIG. 10, the polarization components 118 and 122 have been displaced to locations 130 and 132, respectively. Next, the polarization components 118 and 122 travel through the upper half-wave plate 52, which rotates the polarization components 118 and 122 in the clockwise direction by 45°, as shown in FIG. 11. The other polarization components 120 and 124 travel through the lower half-wave plate 54, which rotates the polarization components 120 and 124 in the counter-clockwise direction, also shown in FIG. 11. The polarization components 118,120,122 and 124 then travel through the Faraday rotator 56, which rotates all the polarization components 118–124 in the clockwise direction by 45°, as shown in FIG. 12. The overall effect of the upper half-wave plate 52 in conjunction with the Faraday rotator 56 is a 90° rotation of the polarization components 118 and 122 in the clockwise direction. On the other hand, the overall effect of the lower half-wave plate 54 and the Faraday rotator 56 is a 0° rotation o components 120 and 124.

In FIG. 12, the polarization components 118–124 are shown that are about to enter the focusing lens 16. The focusing lens 16 initially refracts the propagating paths of the polarization components 118–124, such that the polarization components 118–124 are propagating in a converging manner. However, the polarization components 118–124 begin to diverge after reaching a focal point of focusing lens 16. When the polarization components 118–124 reach the compensating lens 20, the polarization components 118–124 have been inversely projected onto the compensating lens 20. The compensating lens 20 does not affect the relative positions of the polarization components 118–124. However, the compensating lens 20 does stop the divergence of the polarization components 118–124.

The effect of the focusing lens 16 is shown in FIG. 13, which illustrates the polarization components 118–124 prior to entering the shift plate 24. Four new locations 134, 136, 138 and 140 are shown in FIG. 13. The polarization component 118, which was positioned in the upper left section at location 130 in FIG. 12, is now positioned in the lower right section at location 136. Similarly, the relative positions of the polarization components 120,122 and 124 have been changed from locations 126,128 and 132 to locations 140, 134 and 138, respectively.

From the locations shown in FIG. 13, the polarization components 118–124 travel through the shift plate 24. The polarization components 122 and 124 are displaced to locations 136 and 140, respectively. The polarization components 118 and 120 are displaced to two new locations 142 and 144, respectively. The polarization components 118–124 next encounter the compensating lens 22 and the focusing lens 18. The compensating lens 22 and the focusing lens 18 operate to reverse the effects of the focusing lens 16 and the compensating lens 20. The compensating lens 22 inversely projects the polarization components 118–124 onto the focusing lens 18. The focusing lens 18 refracts the polarization components 118–124 from the compensating lens 22 to a direction parallel to the z-axis. The overall effect of the compensating lens 22 and the focusing lens 18 is to reposition the polarization components 118–124 back to relative positions prior to entering the focusing lens 16.

The polarization components 122 and 124 are now in locations 130 and 126, respectively, as shown in FIG. 15. In addition, the polarization components 118 and 120 are positioned at two new locations 146 and 148, respectively. The polarization components 118–124 then travel through the Faraday rotator 64. In FIG. 16, the polarization components 118–124 have been rotated by 45° in the counter-clockwise direction by the Faraday rotator 64. Next, the polarization components 118 and 122 are rotated by the upper half-wave plate 60 in the counter-clockwise direction by 45°, while the other polarization components 120 and 124 are rotated by the lower half-wave plate 62 in the clockwise direction by 45°, as shown in FIG. 17. The overall effect of the Faraday rotator 64 and the upper half-wave plate 60 is a 90° rotation of the polarization components 118 and 122 in the counter-clockwise direction. On the other hand, the overall effect of the Faraday rotator 64 and the lower half-wave plate 62 is a 0° rotation of the polarization components 120 and 124.

In FIG. 18, the polarization components 118–124 are recombined by the walk-off crystal 58 in front of the fiber holder 48. The polarization component 118 is displaced to location 148 to recombine with the polarization component 120. In addition, the polarization component 122 is displaced to location 126 to recombine with the polarization component 124. As stated above, the optical fiber 42 is aligned with the location 126. Thus, the polarization components 118 and 120 will be transmitted to the optical fiber 42. Furthermore, the location 148 is aligned with the optical fiber 40. Therefore, the polarization components 122 and 124 will be transmitted to the optical fiber 40. In a similar manner, a light beam from the optical fiber 36 will be transmitted to the optical fiber 44.

Figure 20:
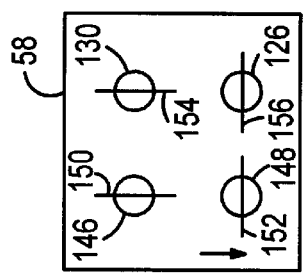
Figure 19:
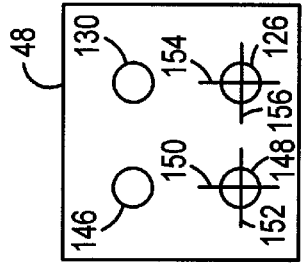

The rearward propagation of light beams from the optical fibers 40 and 42 to the optical fibers 30 and 32, respectively, is illustrated in FIGS. 19–28. When applicable, the same reference numerals will be used for illustrating the various locations of the light beams along the multi-port optical circulator 10 in the rearward direction, i.e., negative z-direction. Turning to FIG. 19, a rearward propagating light beam having polarization components 150 and 152 exits from the optical fiber 40 and is about to enter the second optical assembly 14 at location 148. In addition, a second rearward propagating light beam having polarization components 154 and 156 exits from the optical fiber 42 and is about to enter the optical assembly 14 at location 126. Shown in FIG. 20, the polarization components 150–156 have traveled through the walk-off crystal 58. Walk-off crystal 58 has displaced the polarization components 150 and 154 in the positive y-direction to locations 146 and 130, respectively, as shown in FIG. 20.

Figure 22:
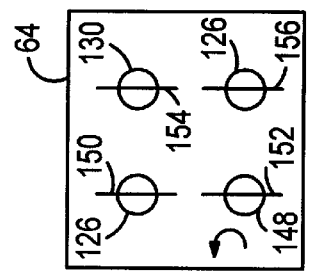
Figure 21:
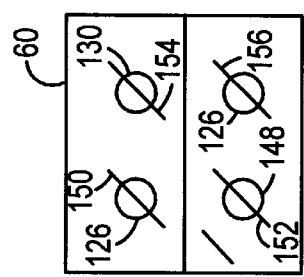

After the walk-off crystal 58, the polarization components 150 and 154 travel through the upper half-wave plate 60, while the polarization components 152 and 156 travel through the lower half-wave plate 62. The polarization components 150 and 154 are rotated by 45° in the clockwise direction by the upper half-wave plate 60, as shown in FIG. 21. However, the polarization components are rotated by 45° in the counter-clockwise direction by the lower half-wave plate 62, as shown in FIG. 21. Next, the polarization components 150–156 are all rotated by 45° in the counter-clockwise direction by the Faraday rotator 64. As shown in FIG. 22, the polarization components 150–156 are now in a vertical position. The polarization components 150–156 then travel through the focusing lens 18.

Figure 23:
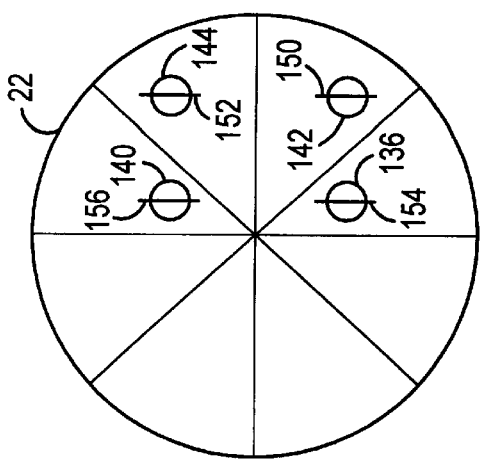
FIGS. 19–28 illustrate the operations performed upon polarization components of rearward propagating light beams through the multi-port optical circulator of FIG. 1.
Figure 24:
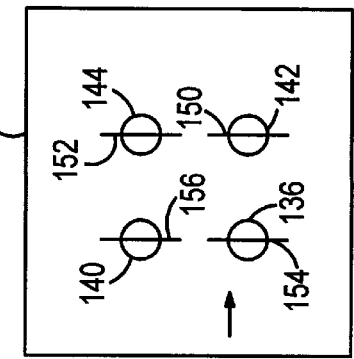

Identical to the effect of the focusing lens 16 and the compensating lens 20 on forward propagating polarization components, the focusing lens 18 has inversely projected the polarization components 150–156 onto the compensating lens 22, as shown in FIG. 23. In front of the compensating lens 22, the polarization components 150, 152, 154 and 156 are now at locations 142, 144, 136 and 140, respectively. In FIG. 24, the polarization components 150–156 have traveled through the shift plate 24. The shift plate 24 does not affect any of the polarization components 150–156, because the polarization states of the polarization components 150–156 are orthogonal to the walk-off direction of the shift plate 24.

Figure 25:
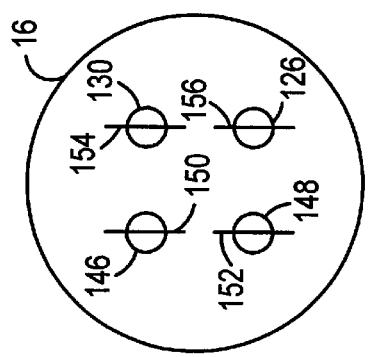

Next, the polarization components 150–156 travel through the compensating lens 20 and the focusing lens 16. The effect of polarization components traveling through the compensating lens 20 and the focusing lens 16 in the rearward direction is identical to the effect of the compensating lens 22 and the focusing lens 18 on polarization components propagating in the forward direction. The compensating lens 22 inversely projects the polarization components 150–156 onto the focusing lens 16. The polarization components 150–156 then travel through the focusing lens 16. In FIG. 25, the polarization components 150,152,154 and 156 are shown at locations 146, 148, 130 and 126, respectively, in front of the focusing lens 16. The focusing lens 16 has redirected the polarization components 150–156, such that the propagation paths of the polarization components 150–156 are parallel to the z-axis. The polarization components 150–156 then enter the optical assembly 12, encountering the Faraday rotator 56.

Figure 27:
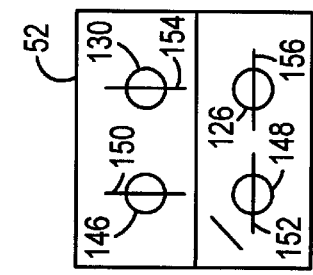
Figure 26:
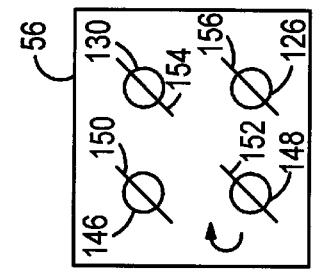

In FIG. 26, the polarization components 150–156 have been rotated by 45° in the clockwise direction by the Faraday rotator 56. Next, the polarization components 150 and 154 are rotated by the upper half-wave plate 52 in the counter-clockwise direction by 45°, while the other polarization components 152 and 156 are rotated by the lower half-wave plate 54 in the clockwise direction by 45°, as shown in FIG. 27. The overall effect of the Faraday rotator 56 and the upper half-wave plate 52 is a 0° rotation of the polarization components 150 and 154. On the other hand, the overall effect of the Faraday rotator 56 and the lower half-wave plate 54 is a 90° rotation of the polarization components 152 and 156.

Figure 28:
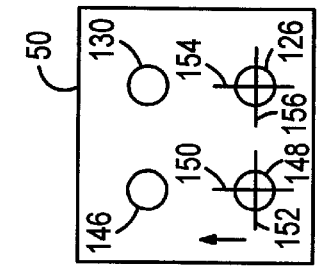

The polarization components 150 and 154 are then displaced in the negative y-direction by the walk-off crystal 50 to locations 148 and 126, respectively, as shown in FIG. 28. As stated above, the optical fiber 30 is aligned with location 148. In addition, the optical fiber 32 is aligned with location 126. Thus, the polarization components 150 and 152 will be transmitted to the optical fiber 30, coupling the optical fiber 40 to the optical fiber 30 in the rearward direction. Similarly, the polarization components 154 and 156 will be transmitted to the optical fiber 32, coupling the optical fiber 42 to the optical fiber 32 in the rearward direction. In a similar manner, the optical fiber 44 is coupled to the optical fiber 34 and the optical fiber 46 is coupled to the optical fiber 36 for rearward transmission of light beams.

The optical elements in the optical assembly 12 can be configured in a number of alternative arrangements without affecting the operation of the first optical assembly. Again, the second optical assembly 14 is structurally identical to the first optical assembly 12. Therefore, the arrangement of the optical assembly 12 will affect the arrangement of the optical assembly 14. First, the walk-off crystal 50 may have a walk-off direction in either vertical direction, i.e., the positive or negative y-direction, to separate the polarization components of a light beam. Second, the upper and lower half-wave plates 52 and 54 can be positioned in front of the Faraday rotator 56 or rearwardly of the Faraday rotator 56. The only concern is that one polarization component of a light beam travels through the upper half-wave plate 52, while the other polarization component travels through the lower wave plate 54. Preferably, each of the Faraday rotator 56 and the half-wave plates 52 and 54 provides a 45° rotation of polarization components. If the walk-off crystal 50 has a walk-off direction in the positive y-direction, the Faraday rotator 56 and the upper half-wave plate 52 can provide clockwise rotations of a forward propagating polarization component, while the lower half-wave plate 54 provides a counter-clockwise rotation. Alternatively, the Faraday rotator 56 and the upper half-wave plate 52 can provide counter-clockwise rotations, while the lower half-wave plate 54 provides a clockwise rotation. If the walk-off crystal 50 has a walk-off direction in the negative y-direction, the rotations of the upper and lower half-wave plates 52 and 54 are reversed.

Although the multi-port optical circulator 10 is shown coupling eight optical fibers, the multi-port optical circulator 10 can be slightly modified to couple additional optical fibers. The only substantive modification needed to accommodate additional optical fibers is the surface configuration of the compensating lenses 20 and 22. Each two additional optical fibers would require a pair of new surfaces on the compensating lenses 20 and 22.

Figure 29:
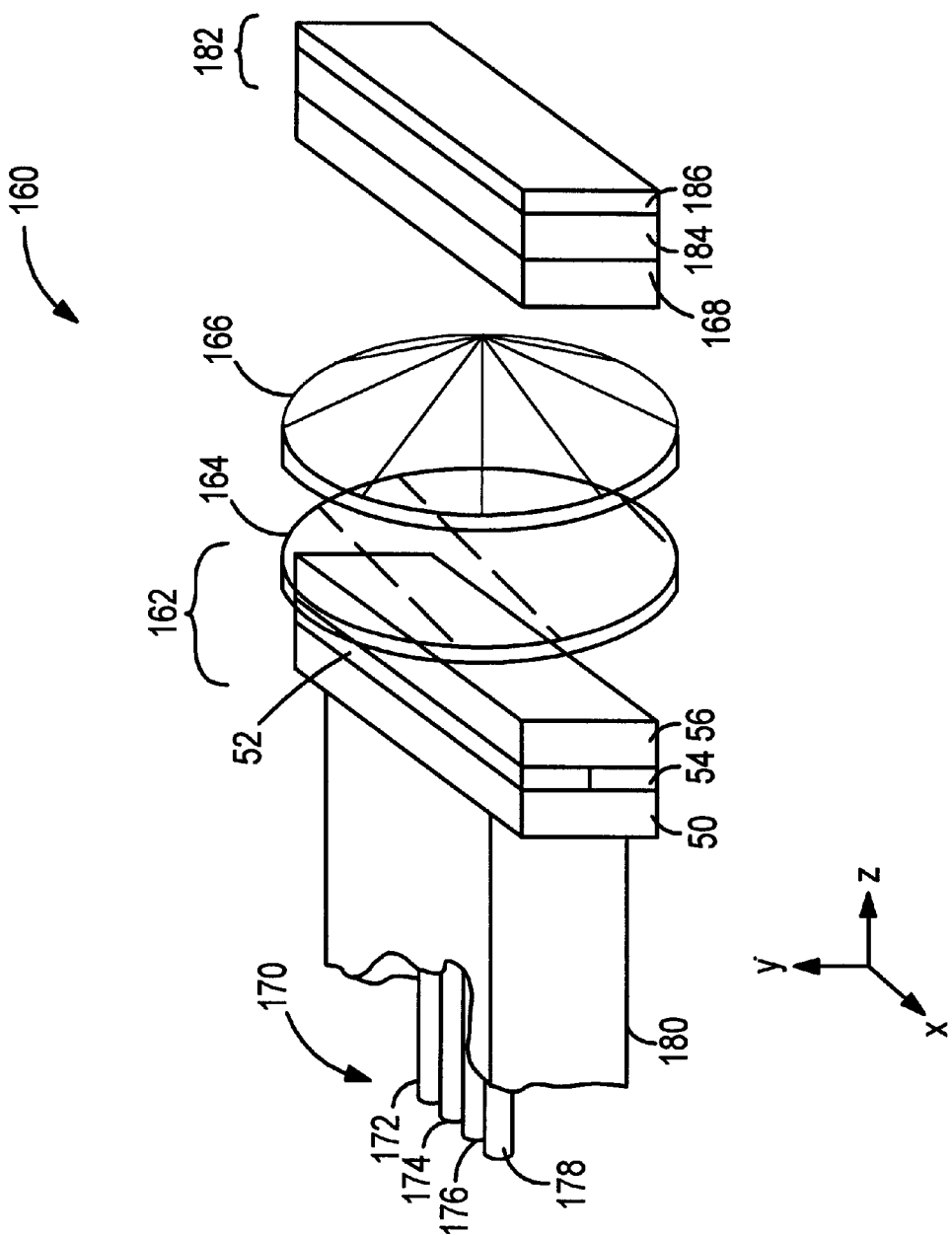
FIG. 29 is a perspective view of a multi-port optical circulator in accordance with a second embodiment of the invention.

Turning to FIG. 29, a perspective view of a multi-port optical circulator 160 in accordance with the second embodiment of the invention is shown. The multi-port optical circulator 160 includes an optical assembly 162, a focusing lens 164, a compensating lens 166, and a shift plate 168. The optical assembly 162 is identical to the optical assembly 12 of the multi-port optical circulator 10. The optical assembly 162 includes the walk-off crystal 50, the upper and lower half-wave plates 52 and 54, and a Faraday rotator 56. Also shown in FIG. 29 is an array of optical fibers 170. The array 170 contains four optical fibers 172, 174,176 and 178 in a fiber holder 180. Similar to the multi-port optical circulator 10, the multi-port optical circulator 160 can be modified to accommodate more or fewer optical fibers. The multi-port optical circulator 160 further includes a mirror assembly 182. The mirror assembly 182 is comprised of a Faraday rotator 184 and a mirror 186.

The multi-port optical circulator 160 operates to transmit light beams emitted from one of the optical fibers 172–176 to an adjacent optical fiber. For example, a light beam from the optical fiber 172 will propagate through the multi-port optical circulator 160 and be transmitted to the optical fiber 172. In this configuration, the optical fiber 172 is a unidirectional input fiber and the optical fiber 178 is a unidirectional output fiber. However, the optical fibers 174 and 176 are bidirectional input/output fibers.

In operation, a light beam enters the optical assembly 162 from one of the optical fibers 172–176. The light beam is initially separated into polarization components within the optical assembly 162. The polarization components then travel through the rest of optical assembly 162, the focusing lens 164, the compensating lens 166, and the shift plate 168 in the same manner as polarization components of a light beam traveling through the optical assembly 12, the focusing lens 16, the compensating lens 20, and the shift plate 24 of the multi-port optical circular 10. However, unlike the multiport optical circulator 10, the polarization components are reflected back by the mirror 186 of the multi-port optical circulator 160. Therefore, the polarization components will propagate through the shift plate 168, the compensating lens 166, the focusing lens 164, and the optical assembly 162 a second time.

The functions of the Faraday rotator 184 of the mirror assembly 182 is to change the polarization states of the polarization components so that the reflected light is not shifted a second time by the shift plate 168. This is achieved by rotating polarization components of a light beam twice by 45° in either the clockwise or the counter-clockwise direction. Because of the nonreciprocal nature of a Faraday rotator, the polarization components are first rotated by 45° when propagating through the Faraday rotator 184 in the forward direction, and further rotated by 45° in the same direction when propagating through the Faraday rotator 184 in the rearward direction.

Figure 30:
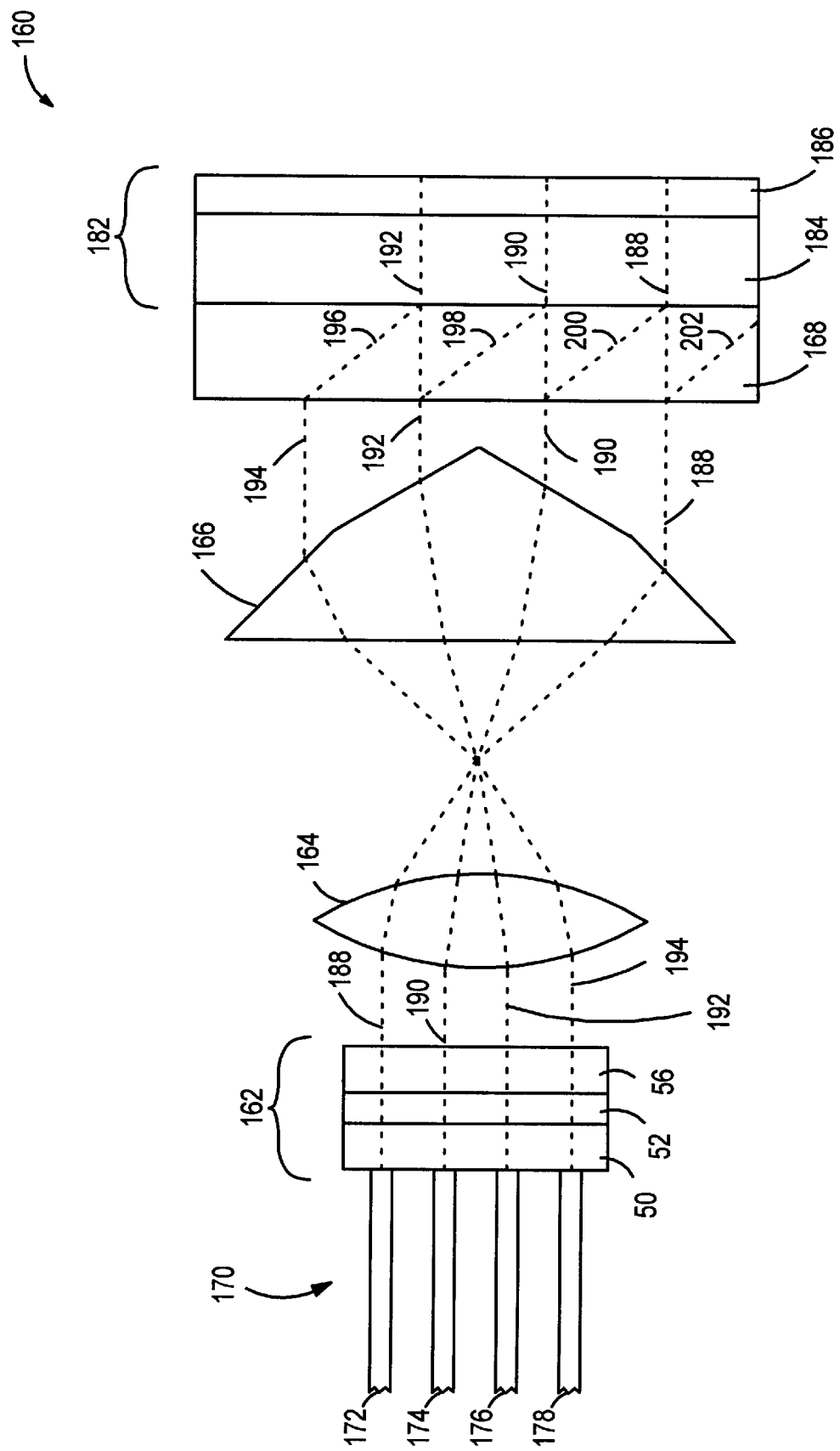
FIG. 30 is a top view of the multi-port optical circulator of FIG. 29 with illustrations of propagation paths in the x-direction.

In FIG. 30, a top view of the multi-port optical circulator 160 is illustrated. Also shown in FIG. 30 are four propagation paths 188,190,192 and 194. Each of the propagation paths 180–194 represents a potential path taken by both polarization components of a single light beam from one of the optical fibers 172–176. Similar to FIG. 7, four displacing paths 196,198, 200 and 202 are shown within the shift plate 168. These paths are taken by only forward propagating polarization components. In a rearward direction, the polarization components are not affected by the shift plate 168, because they have been rotated perpendicularly by the Faraday rotator 184. In this manner, a light beam from one of the optical fibers 172–176 is transmitted to an adjacent optical fiber.

Figure 31:
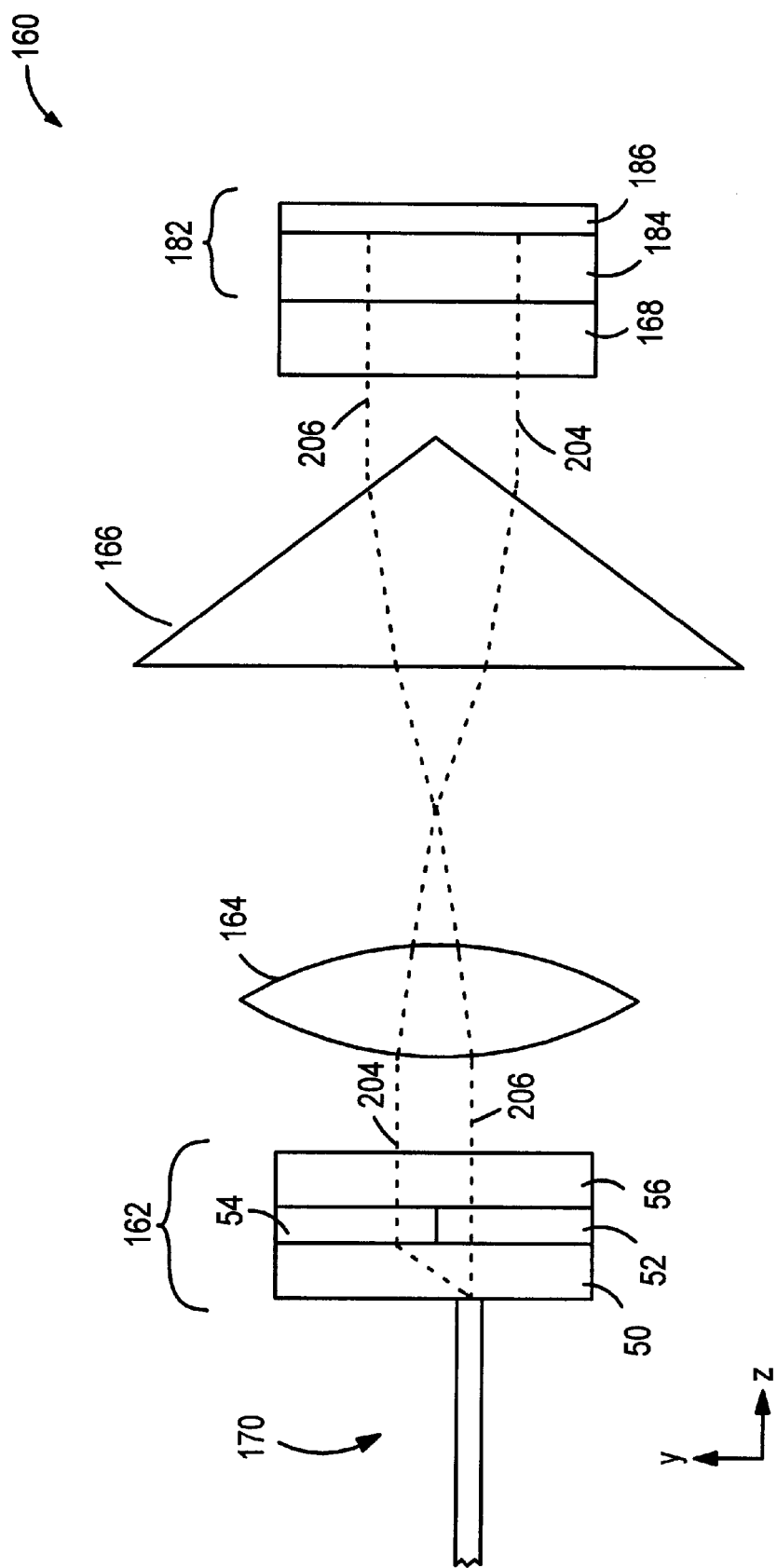
FIG. 31 is a side view of the multi-port optical circulator of FIG. 29 with illustrations of two propagation paths in the y-direction.

FIG. 31 illustrates a side view of the multi-port optical circulator 160. Also shown in FIG. 31 are two propagation paths 204 and 206 with respect to the y-axis. The two propagation paths 204 and 206 represent paths taken by polarization components of any light beam from one of the optical fibers 172–178 of the array of fibers 170 through the multi-port optical circulator 160. Polarization components of a light beam will follow the paths 204 and 206 in the forward direction as well as in the rearward direction, after being reflected by the mirror 186 of the mirror assembly 182.

FIGS. 32–38 illustrate the operations performed upon polarization components of forward propagating light beams through the multi-port optical circulator 160, before being reflected back by the mirror 186. Again for simplicity, only two light beams from the optical fibers 174 and 176 are illustrated. Each of the seven figures is an illustration of the relative positions of the polarization components of the two light beams before and after traveling through one of the optical elements in the multi-port optical circulator 160, as viewed from the position of the array of fibers 170.

Figure 32:
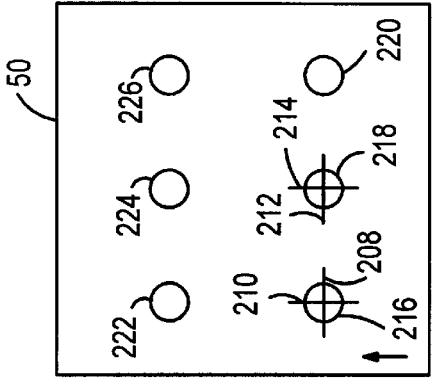

In FIG. 32, a first pair of orthogonal polarization components 208 and 210 and a second pair of orthogonal polarization components 212 and 214 that are about to enter input ports, i.e., windows, at the forward face of the optical assembly 162 are shown. The polarization components 208 and 210 represent a light beam from the optical fiber 174 that is about to enter the input port positioned at location 216. The polarization components 212 and 214 represent a light beam from the optical fiber 176 that is about to enter the input port positioned at location 218. The optical fibers 174 and 176 are aligned with locations 216 and 218, respectively. Location 220 is aligned with the optical fiber 178. The other locations 222, 224 and 226 are positions of ports on the rearward face of the optical assembly 162.

Figure 35:
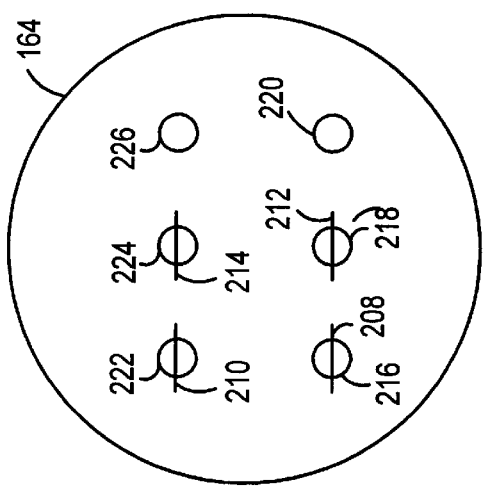
FIGS. 32–38 illustrate the operations performed upon polarization components of forward propagating light beams through the multi-port optical circulator of FIG. 29, before being reflected by a mirror at the rearward face of the multi-port optical circulator of FIG. 29.
Figure 34:
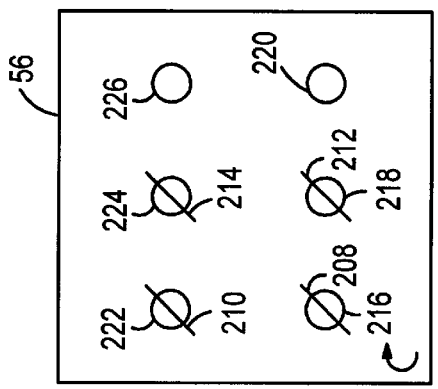
Figure 33:
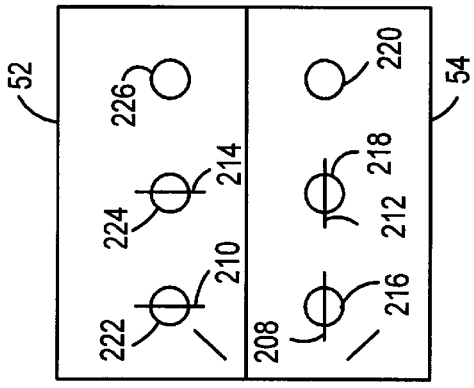

The light beams enter the first optical assembly 162, encountering the walk-off crystal 50. The polarization components 210 and 214 are displaced to locations 222 and 224 by the walk-off crystal 50, as shown in FIG. 33. The polarization components 210 and 214 are then rotated 90° by the upper half-wave plate 52 and the Faraday rotator 56, as shown in FIGS. 34 and 35. However, the polarization components 208 and 212 are rotated 0° by the lower half-wave plate 54 and the Faraday rotator 56.

Figure 38:
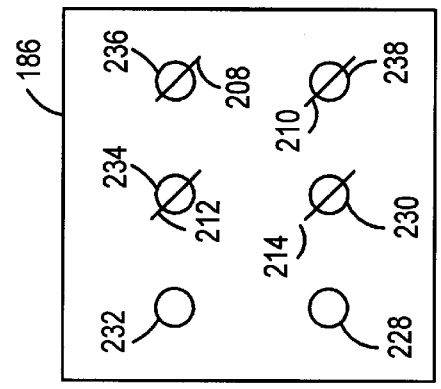
Figure 37:
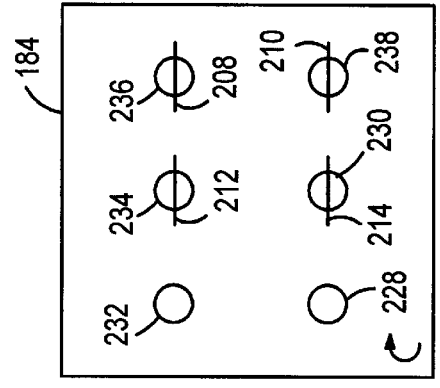
Figure 36:
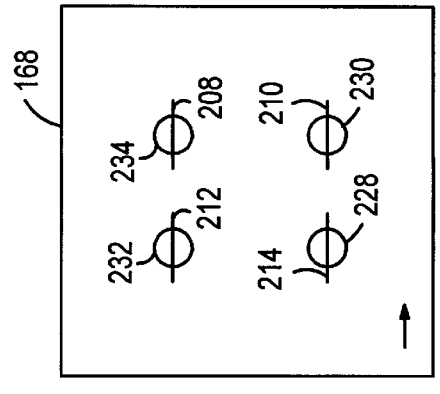

Next, the polarization components 208–214 propagate through the focusing lens 164 and the compensating lens 166 in the same manner as the polarization components 118–124 through the focusing lens 16 and the compensating lens 20 of the multi-port optical circulator 10. The effects of the focusing lens 164 and the compensating lens 166 on polarization components 208–214 are illustrated in FIG. 36. The polarization components 208, 210, 212 and 214 are positioned at new locations 234, 230, 232, and 228, respectively. The polarization components 208–214 then travel through the shift plate 168, which laterally displaces the polarization components 208–214 in the positive x-direction, as shown in FIG. 37. The polarization components 212 and 214 are displaced to locations 234 and 230, respectively. The other two polarization components 208 and 210 are displaced to two new locations 236 and 238, respectively. In FIG. 38, the polarization components 208–214 have been rotated by 45° in a clockwise direction by the Faraday rotator 184. The polarization components 208–214 are then reflected by the mirror 186.

FIGS. 39–45 illustrate the operations performed upon polarization components of rearward propagating light beams through the multi-port optical circulator 160 of FIG. 29, after being reflected by the mirror 186 at the rearward face of the multi-port optical circulator 160. Again, each of the seven figures is an illustration of the relative positions of the polarization components of the two light beams before and after traveling through one of the optical elements in the multi-port optical circulator 160, as viewed from the position of the fiber array 170.

In FIG. 39, the polarization components 208, 210, 212 and 214 have been reflected by the mirror 186 and are propagating in the rearward direction toward the array of fibers 170. The polarization components 208–214 then travel through the Faraday rotator 184, which further rotates the polarization components by 45° in the clockwise direction, as shown in FIG. 40. Next, the polarization components 208–214 travel through the shift plate 168. However, in the rearward direction, the polarization components 208–214 are not displaced by the shift plate 168, because the polarization states of the polarization components 208–214 are orthogonal to the walk-off direction of the shift plate 168.

Next, the polarization components 208–214 propagate through the compensating lens 166 and the focusing lens 164. The compensating lens 166 and the focusing lens 164 operate on the polarization components 208–214 in the identical manner as the focusing lens 18 and the compensating lens 22 of the multi-port optical circulator 10 on the polarization components 118–124, as shown in FIGS. 14 and 15. After passing through the focusing lens 164, the polarization components 208, 210, 212 and 214 are positioned at locations 218, 224, 220 and 226, respectively, as shown in FIG. 42. The polarization components 208–214 then propagate through the Faraday rotator 56. In FIG. 43, the polarization components 208–214 have been rotated by 45° in the clockwise direction by the Faraday rotator 56. The polarization components 208 and 212 are further rotated by 45° in the clockwise direction by the lower half-wave plate 54, as shown in FIG. 44. However, the polarization components 210 and 214 are re-rotated by 45° in the counter-clockwise direction by the upper half-wave plate 52.

Lastly, the polarization components 210 and 214 are displaced to locations 218 and 220, respectively, by the walk-off crystal 50. Thus, the polarization components 208 and 210 have been recombined by the walk-off crystal 50 and are transmitted to the optical fiber 176, which is aligned with location 218. Similarly, the polarization components 212 and 214 are recombined and transmitted to the optical fiber 178, which is aligned with location 220. In a similar manner, a light beam from the optical fiber 172 is transmitted to the optical fiber 174.

Figure 46:
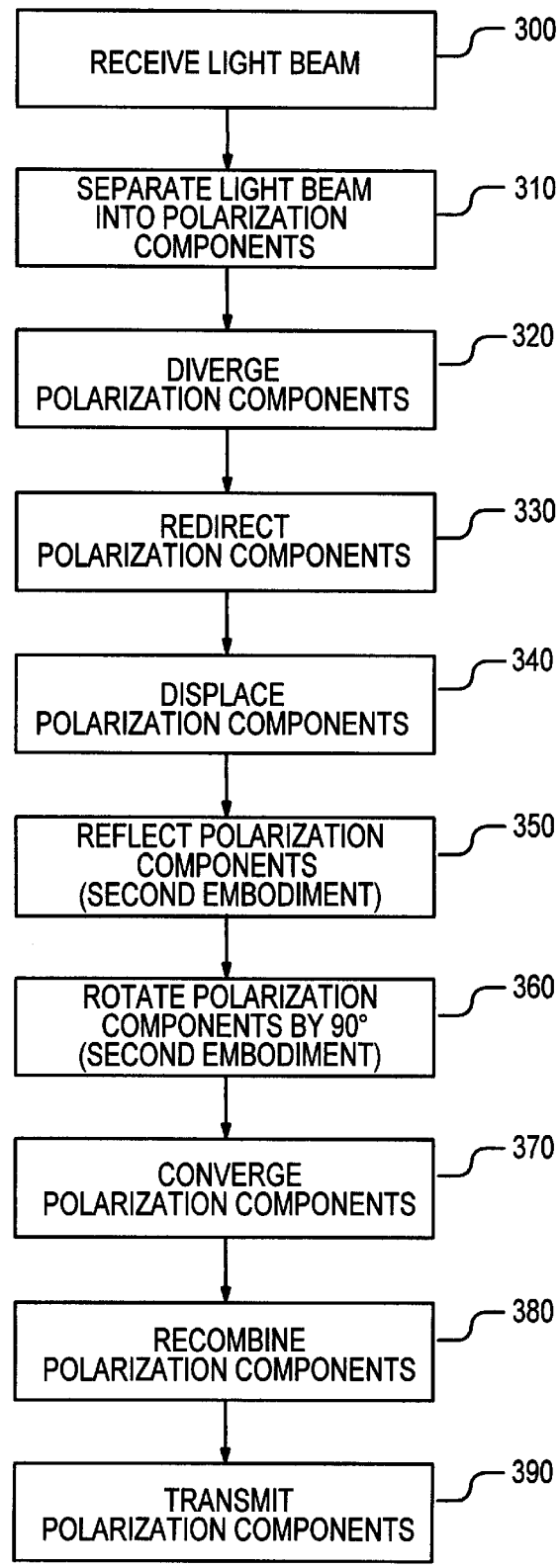
FIG. 46 is a flow diagram of a method of circulating light beams from and to multiple input/output optical fibers in accordance with the invention.

A method of transferring circulating optical signals from multiple optical fibers utilizing a multi-port optical circulator in accordance with the invention is illustrated as a flow diagram in FIG. 46. First, a light beam is received at step 300 by an optical assembly of the multi-port optical circulator from a first optical fiber in an array of fibers. The light beam is then separated in step 310 into polarization component by the optical assembly. Next, one of the polarization components is rotated, such that both polarization components have a common polarization state. The polarization components are then diverged in step 320 such that the polarization components are moving away relative to each other. In the process of diverging the polarization components, the polarization components are also inversely projected.

Next, the polarization components are redirected in step 330 such that the polarization components are propagating in a parallel manner. After being redirected, the polarization components are laterally displaced, as shown at step 340. In one embodiment, the polarization components are reflected toward the array of fibers as indicated at step 350. In addition, the polarization components are rotated perpendicularly in step 360. The displaced polarization components are then converged in step 370 such that the separation of the polarization components are decreasing. Next, the converging polarization components are again redirected to propagate in a parallel manner. Propagating in the parallel manner, one of the polarization components is rotated perpendicularly. Lastly, the polarization components are recombined in step 380 and transmitted at step 390 to a second optical fiber.

What is claimed is:

1. A method of transferring optical signals comprising steps of:
    receiving a light beam at an input port located on a forward face of an optical assembly,
    spatially separating said light beam into polarization components within said optical assembly;
    diverging said polarization components such that a distance between said polarization components progressively increases;
    redirecting said diverging polarization components to propagate in a substantially parallel manner, including a step of refracting said polarization components using a compensating lens having a plurality of flat surfaces, each of said polarization components being refracted by a particular flat surface of said plurality of flat surfaces;
    displacing said polarization components in a lateral direction using at least one nonreciprocal optical element;
    converging said polarization components such that said distance between said polarization components progressively decreases;
    recombining said polarization components to reform said light beam; and
    transmitting said light beam via a predetermined optical line.

2. The method of claim 1 further comprising a step of reflecting said polarization components back through said optical assembly following said step of spatially separating said polarization components and prior to said step of recombining said polarization components.

3. The method of claim 2 further comprising a step of perpendicularly rotating said polarization components, following said step of spatially separating said light beam.

4. The method of claim 1 wherein said step of diverging said polarization components includes a step of individually focusing said polarization components to provide transmission of said polarization components.

5. The method of claim 1 wherein said step of diverging and said step of converging said separated polarization components further include inverting relative positions of said polarization components with respect to a common point.

6. A multi-port nonreciprocal optical device comprising:
    separating means positioned to receive a light beam from a first optical line for dividing said light beam into first and second polarization components having propagating directions substantially parallel with respect to a predefined direction;
    dispersing means in optical series with said separating means for deflecting said first and second polarization components such that a distance between said first and second polarization components progressively increases with distance from said separating means, said propagating directions of said first and second polarization components being altered to propagating directions non-parallel to said predefined direction;
    redirecting means optically coupled to said dispersing means for adjusting said propagating directions of said first and second polarization components back to being substantially parallel to said predetermined direction, wherein said redirecting means is a compensating lens having a plurality of facets, including first and second facets configured to refract said first and second polarization components, respectively, to adjust said propagating directions;
    nonreciprocal displacing means that is optically coupled to said redirecting means for laterally shifting said first and second polarization components;
    converging means optically coupled to said nonreciprocal displacing means for deflecting said first and second polarization components such that said distance between said first and second polarization components progressively decreases with distance from said nonreciprocal displacing means; and
    recombining means optically coupled to said converging means for combining said first and second polarization components for output via a second optical line.

7. The device of claim 6 wherein said compensating lens includes N facets, where N is proportional to a number of optical lines being coupled by said device.

8. The device of claim 6 wherein said separating means, said nonreciprocal displacing means, and recombining means are walk-off crystals.

9. The device of claim 6 wherein said dispersing means is a converging lens.

10. The device of claim 6 further comprising a first nonreciprocal rotator and a second nonreciprocal rotator, said first nonreciprocal rotator being optically coupled to said separating means, said second nonreciprocal rotator being optically coupled to said recombining means.

11. The device of claim 10 wherein each of said first and second nonreciprocal rotators includes a Faraday rotator and a half-wave plate.

12. A multi-port optical device for signal transmission comprising:

an optical assembly having a forward face with multiple ports to receive and emit light signals from and to a plurality of optical lines, said plurality of optical lines including adjacent first and second optical lines, said optical assembly including a separating means for dividing a light beam from said first optical line into first and second polarization components;

focusing means optically coupled to said optical assembly for individually focusing said first and second polarization components, said focusing means having a diverging effect with respect to directing said first and second polarization components in a diverging manner;

compensating means, in optical series with said focusing means, for directing said first and second polarization components to propagate in a generally parallel manner, said compensating means configured to substantially counter said diverging effect of said focusing means;

reflecting means positioned rearwardly of said optical assembly for redirecting said first and second polarization components back toward said optical assembly; and nonreciprocal displacing means positioned between said reflecting means and said optical assembly for guiding said first and second polarization components for output via said second optical line.

13. The device of claim 12 wherein said compensating means is a compensating lens having a plurality of flat surfaces, two of said plurality of flat surfaces being configured to refract said first and second polarization components by predetermined angles.

14. The device of claim 13 wherein said plurality of flat surfaces have N flat surfaces, where N is proportional to the number of said multiple ports in said optical assembly.

15. The device of claim 12 wherein reflecting means includes a mirror and a nonreciprocal rotator, said nonreciprocal rotator configured to perpendicularly rotate said first and second polarization components said light beams.

16. The device of claim 12 wherein said optical assembly further include a nonreciprocal rotator having a Faraday rotator and a half-wave plate.

17. The device of claim 12 wherein said separating means and said nonreciprocal displacing means are walk-off crystals.

18. The device of claim 12 wherein said focusing means is a converging lens.

* * * * *